United States Patent [19]

Ryall et al.

[11] 4,108,569
[45] Aug. 22, 1978

[54] LUBRICATED MECHANICAL SEALS FOR PUMPS

[75] Inventors: Michael Leslie Ryall; James Rennie Robertson, both of Glasgow, Scotland

[73] Assignee: Weir Pumps Limited, Glasgow, Scotland

[21] Appl. No.: 690,081

[22] Filed: May 26, 1976

[30] Foreign Application Priority Data

May 28, 1975 [GB] United Kingdom ............... 23262/75

[51] Int. Cl.² ...................... F04D 29/12; F16J 15/16; F16J 15/40; F16J 15/54
[52] U.S. Cl. .................................. 415/112; 415/113; 415/174; 277/3
[58] Field of Search .................. 415/112, 113, 173 R, 415/174, 175; 277/3, 27, 15

[56] References Cited

U.S. PATENT DOCUMENTS

| 2,710,205 | 6/1955 | Brkich | 277/3 |
| 3,081,095 | 3/1963 | Hamrick | 277/3 X |
| 3,154,020 | 10/1964 | Sieghartner | 415/113 |
| 3,558,238 | 1/1971 | Van Herpt | 415/112 UX |
| 3,888,495 | 6/1975 | Mayer | 277/3 |

FOREIGN PATENT DOCUMENTS 136,186   1961   U.S.S.R. .................................. 415/113

Primary Examiner—Carlton R. Croyle
Assistant Examiner—Donald S. Holland
Attorney, Agent, or Firm—Mason, Fenwick & Lawrence

[57] ABSTRACT

In a rotodynamic pump intended for operation at high pressures e.g. 2000 p.s.i. and for pumping contaminated fluids e.g. corrosive water, high pressure sealing assemblies are provided at the through-openings in the pump casing for the pump shaft. Each assembly includes a pair of axially spaced mechanical seals, and each seal comprises a rotor portion fixed to the pump shaft and a stator portion axially movable into sealing engagement with the rotor portion, the stators being located intermediate the rotor portions. A busing is located between the seals and includes conduits supplying oil at a pressure above pump pressure to the innermost seal whence the oil is reduced in pressure and passed to the outermost seal, so that oil is delivered to the facing ends of the stators. The oil serves for lubrication of the sealing interfaces and for the prevention of egress of contaminated material through said innermost seal.

5 Claims, 1 Drawing Figure

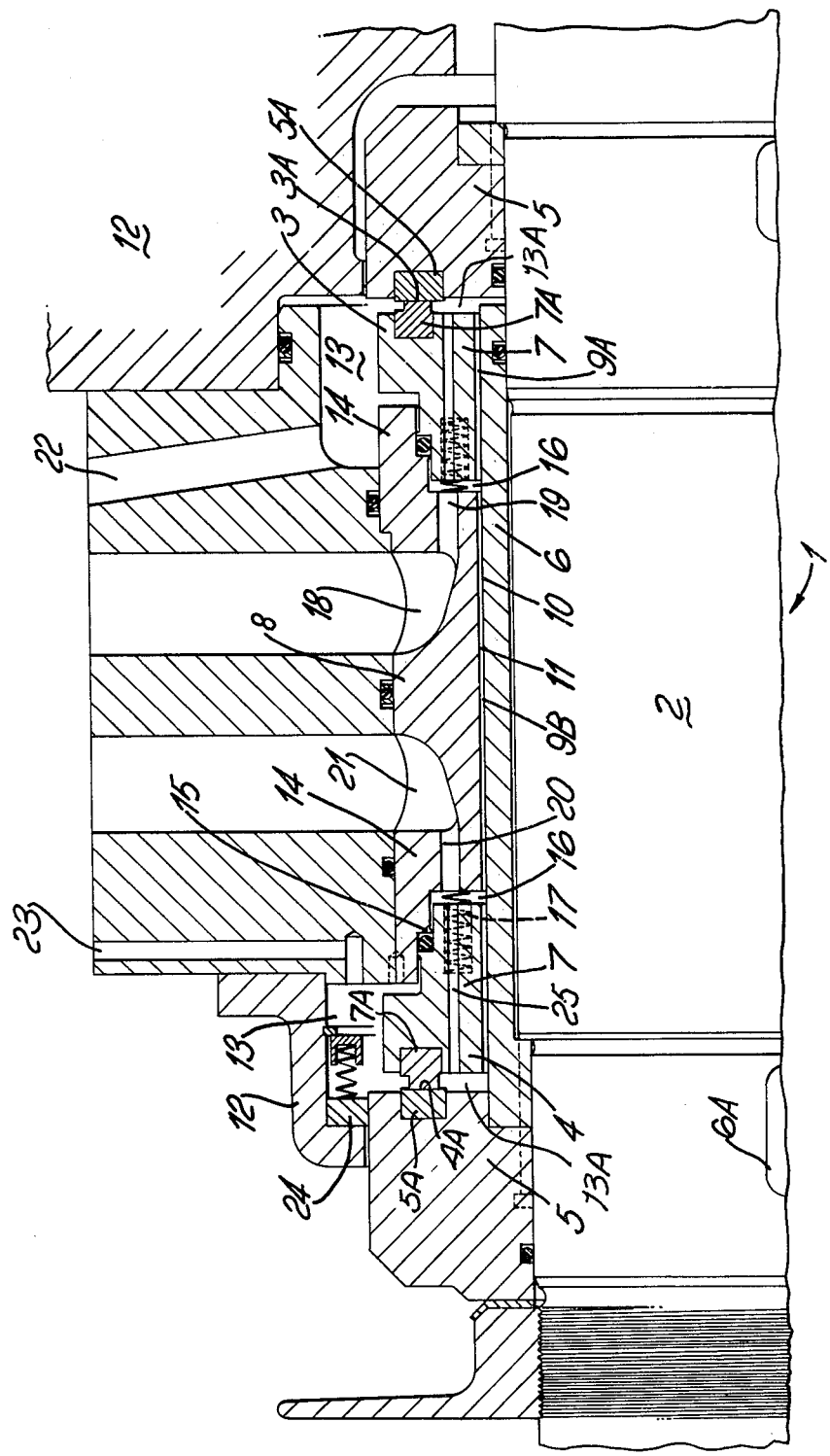

LUBRICATED MECHANICAL SEALS FOR PUMPS

The present invention concerns improvements in or relating to pumps and to seal assemblies for pumps.

The invention relates especially but not exclusively to pumps incorporating shaft seals which have to operate satisfactorily at high ambient temperatures and at pressure differentials of about 2000 psi in a contaminated environment.

SUMMARY OF INVENTION

It is an object of the present invention to provide a pump seal assembly which can operate effectively at high pressures and which can satisfactorily seal against a contaminated fluid, for example water with suspended sand particles.

The present invention provides a seal wherein if any leakage occurs across the sealing faces of the seal assembly it will be of sealing fluid (e.g. oil) rather than contaminated liquid thus obviating the risk of damage to the seal faces by minute particles suspended in the liquid.

Additionally with the seal of the present invention the seal element compression springs and sliding surfaces are immersed in lubricating fluid rather than contaminated and often corrosive liquid so that damage during operation is minimized.

According to the present invention there is provided in a machine installation having a fluid container with a high pressure environment of working fluid, a wall bounding said container, and a rotary shaft extending through a through-bore in said wall; a high pressure shaft seal assembly to seal against the escape of working fluid through said through-bore to a low pressure external environment, said shaft seal assembly comprising:
(a) a seal housing;
(b) a pair of axially spaced mechanical seals located in said seal housing, a first one of said seals being located nearer to the fluid container than the other second seal, each seal comprising rotor and stator portions with the stator portions of the seals located intermediate the rotor portions, the stator and rotor portions of each seal providing a sealing interface;
(c) means for urging the stator and rotor portions of each seal into sealing engagement at said sealing interface;
(d) an inner chamber or passage for sealing medium located radially inwardly of each sealing interface;
(e) inlet duct means in the housing for the supply of high pressure sealing and lubricating fluid to the inner annular chamber of said first seal at a pressure above that of said high pressure environment, said inlet duct means including conduit means in the stator portion of said first seal;
(f) passage means for directing sealing and lubricating fluid from said inner chamber of said first seal to the inner chamber adjacent the sealing interface of the second seal; and
(g) an elongate restriction clearance in said passage means to reduce the pressure of the sealing and lubricating fluid passing to the inner chamber of the second seal to a pressure which is a relatively small amount above that of the low pressure external environment.

An embodiment of the present invention will now be described by way of example with reference to the accompanying drawing which shows a schematic sectional view of a pump sealing assembly according to the present invention.

Referring to the drawing a pump designed to handle contaminated or corrosive water is provided with shaft seal assemblies 1 which have to be capable of withstanding a pressure differential of around 2000 psi.

Pump shaft 2 protrudes through walls at both ends of the pump casing 12 and as the seal assemblies 1 employed on each end are the same only one will be described in detail.

A seal assembly 1 comprises two mechanical seals 3, 4 arranged in tandem on the shaft and each being capable of withstanding a pressure differential of 2200 psi in either direction. A rotor 5 of each seal 3, 4 is mounted for rotation with a sleeve 6 which is driven by keys 6A and located axially on the shaft 2 by a shoulder on the shaft and by a shaft nut.

Each seal includes an annular stator 7 which is in sliding and sealing engagement with the rotor 5 and is mounted on an intermediate member 3 in the form of a bushing which is fixed relative to the casing 12, there being an annular restriction clearance 9A between the inner face of the stator 7 and the outer surface 10 of the sleeve 6 on the shaft and an elongate annular restriction clearance 9B between the inner face 11 of the bush and said sleeve 6.

The seals 3, 4 are arranged such that the stators 7 are in mutual facing relationship, i.e. the stators 7 are located intermediate the rotors 5. Consequently the rotor 5 of the inner seal 3 is subjected to pump pressure whereas the rotor 5 of the outer seal 4 is subject to ambient pressure.

The bushing 8 is substantially annular and defines with the casing 12 a housing providing annular cavities 13 in which the seals 3, 4 are located. An end portion 14 located in each cavity 13 from each side of the bushing 8 supports the stator 7 of each seal 3, 4, each of which portions 14 has a radial flange 15 which rests in sealing relationship on the outer surfaces of the stator 7.

At each end of the bushing portion 14 there is an axial clearance 16 between the radial inner face of the portion and the facing radial face of the seal stator 7, this clearance 16 being maintained by hydraulic pressure and a plurality of circumferentially spaced compression springs 17 which ensure the sealing engagement between the rotor and stator 5, 7 of each seal 3, 4.

Circulation to the sealing faces is provided by a plurality of axial holes 25 through the stator 7. The holes 25 discharge into chambers 13A.

The bushing 8 is provided with an inlet duct 18 for pressure sealing fluid. In particular, filtered oil is used as the sealing fluid and has advantages which will be described below.

A passage 19 is provided between the inlet duct 18 and the axial clearance 16 between the bushing portion 14, and the stator 7 of the seal 3 nearest the pump. Thus pressure oil from the duct 18 flows through the passage 19 to this clearance to exert pressure on the stator 7 in a direction towards the pump. Oil is delivered by means of an oil pump (not shown). The oil can then flow through the axial holes 25 in the stator 7 to the chamber 13A radially inwardly of sealing interface 3A of the seal 3, returning through the clearance annulus 9A between stator 7 and sleeve 6 to the sealing interface 3A of the seal 3. Engaging seal barrier elements 5A, 7A are provided in this interface 3A. Similarly seal 4 has sealing interface 4A defined between barrier elements 5A, 7A. Also, seal 4 has a clearance annulus 9A between stator 7 and sleeve 6. The pressure oil can also flow through the annular passage 9B between the inner face 11 of the bushing 8 and the surface 10 of the sleeve 6 to the corresponding sealing interface 4A at the outer seal 4 and return through axial holes 25 to the axial clearance 16 between the radial end face of the bush portion 14 and the facing radial face of the stator 7 so that a fluid pressure is exerted on the stator 7 of the outer seal 4 in a direction towards the rotor 5 of the seal 4.

A further passage 20 communicates this second axial clearance 16 with an outlet duct 21 through the bushing 8 whereby oil may flow out of the bushing and be returned to an oil reservoir. During the passage of oil through the restriction passages and the annulus 9B between the bush 8 and sleeve 6 there will be a considerable pressure drop in the oil. Control means (not shown) are provided to control the oil pressure differential across the inner seal 3. These means can comprise a modulating control valve operatively coupled to two pressure transducers, one monitoring seal inlet pressure and the other pump suction pressure. The valve controls the seal differential pressure, irrespective of pump suction pressure, by varying the oil flow to the seal chamber 13; excess oil being leaked directly back to the oil reservoir.

A conduit 22 in the bushing 8 leads to the cavity 13 accommodating the seal 3 adjacent the pump and permits flushing water to be supplied to this cavity 13, while a further conduit 23 leads from the cavity 13 accommodating the outer seal 4 to provide an escape path for any oil leaking through the outer seal 4.

To prevent oil leakage from the outer cavity 13 of the seal assembly, a floating carbon seal is provided between the rotor 5 of the outer seal 4 and the casing 12.

In operation with the pump having a discharge pressure of 2000 psi, oil is supplied to the inlet duct 18 at 2200 psi and its pressure is reduced as it flows through the various restriction passages to the outlet duct 23. Specifically, the oil pressure is reduced to 50 psig at the duct 23.

Thus a seal assembly is provided which can accommodate a total pressure differential of around 2000 psi although it will be realized that the pressure differential across the seal adjacent the pump is 200 psi and that across the outer seal is 50 psi. Both seals are therefore operating in a clean cool environment under low differential pressure conditions with a very satisfactory lubricating medium.

Further if the inner seal 3 fails completely or even partially, the outer seal 4 should be capable of withstanding the full pressure differential.

If any leakage occurs across the sealing faces of the seal it will be of oil rather than contaminated water thus obviating the risk of damage to the seal face by minute solids suspended in the water.

Further the compression springs and sliding surfaces of the seal are immersed in oil rather than in contaminated and often corrosive water so that damage during operation is minimized.

Protection systems are employed in the installation to cater for various possible breakdowns and failures, for example by stopping of the pump and using a warning signal, or by switching to a standby unit. Examples of the possible failure modes against which protection can be provided are (a) loss of seal oil (b) failure of oil cooler (c) blockage of oil filters (d) failure of oil pump (e) failure of differential pressure control valve, and (f) failure of either or both of inner and outer seals.

The ancillary equipment, for example oil supply means, oil filters, coolers, pressure sensors, etcetera, are well known in the art and will not be described in detail.

We claim:

1. In a machine installation having a rotary shaft extending through a through-bore in a wall of the installation, which wall bounds a high pressure environment of working fluid within the installation from a low pressure external environment; a high pressure shaft seal assembly to seal against the escape of working fluid through said through-bore to (a) the low pressure external environment, said shaft seal assembly comprising:

(a) a seal housing at said through-bore;
   (b) a pair of axially spaced mechanical seals located in said seal housing, a first one of said seals being located nearer to the high pressure environment than the other second seal, each seal comprising rotor and stator portions with the stator portions of the seals located intermediate the rotor portions, the stator and rotor portions of each seal providing a sealing interface;
   (c) means for urging the stator and rotor portions of each seal into sealing engagement at said sealing interface;
   (d) an inner chamber for sealing medium located radially inwardly of each sealing interface;
   (e) inlet duct means in the housing for the supply of high pressure sealing and lubricating fluid to the inner annular chamber of said first seal at a pressure above that of said high pressure environment, said inlet duct means including conduit means in the stator portion of said first seal;
   (f) passage means for directing sealing and lubricating fluid from said inner chamber of said first seal to the inner chamber adjacent the sealing interface of the second seal;

and (g) an elongate restriction clearance in said passage means to reduce the pressure of the sealing and lubricating fluid passing to the inner chamber of the second seal to a pressure which is relatively small amount above that of the low pressure external environment.

2. The combination as claimed in claim 1, wherein a conduit is provided for the discharge of leakage sealing fluid from the second seal.

3. The combination as claimed in claim 1, wherein spring means are provided to urge the stator and rotor portions of each seal into sealing engagement, the spring means being located for lubrication by the sealing and lubricating fluid flowing in said inlet duct means and in said passage means.

4. The combination as claimed in claim 1, wherein said housing includes an intermediate member between said stator portions of the seals, said intermediate member including said inlet duct means and an outlet duct receiving sealing fluid from the second seal, the elongate restriction clearance being defined between the stator portions and a rotor portion of the shaft and between the inner circumference of the intermediate member and said rotor portion.

5. The combination as claimed in claim 4, wherein a conduit for flushing liquid is provided in said intermediate member and discharges into an annular chamber radially outwardly of the sealing interface of said first seal.

* * * * *